(12) United States Patent
Carpenter

(10) Patent No.: US 7,805,309 B2
(45) Date of Patent: Sep. 28, 2010

(54) CONVERSATIONAL USER INTERFACE THAT MIMICS THE ORGANIZATION OF MEMORIES IN A HUMAN BRAIN

(75) Inventor: Carl Edward Carpenter, Ventura, CA (US)

(73) Assignee: Celf Corporation, Ventura, CA (US)

( * ) Notice: Subject to any disclaimer, the term of this patent is extended or adjusted under 35 U.S.C. 154(b) by 711 days.

(21) Appl. No.: 11/276,150

(22) Filed: Feb. 15, 2006

(65) Prior Publication Data

US 2006/0195320 A1    Aug. 31, 2006

Related U.S. Application Data

(60) Provisional application No. 60/652,748, filed on Feb. 15, 2005, provisional application No. 60/740,147, filed on Nov. 29, 2005.

(51) Int. Cl.
G10L 11/00    (2006.01)
G10L 21/00    (2006.01)
G06E 1/00    (2006.01)

(52) U.S. Cl. .................. 704/270; 704/275; 706/18; 706/20; 706/25

(58) Field of Classification Search ............... 704/257, 704/270, 275; 706/18, 20, 25
See application file for complete search history.

(56) References Cited

U.S. PATENT DOCUMENTS

| | | | |
|---|---|---|---|
| 5,855,002 A * | 12/1998 | Armstrong | 704/270 |
| 6,324,513 B1 * | 11/2001 | Nagai et al. | 704/275 |
| 6,505,162 B1 * | 1/2003 | Wang et al. | 704/275 |
| 6,510,411 B1 * | 1/2003 | Norton et al. | 704/254 |
| 6,665,640 B1 * | 12/2003 | Bennett et al. | 704/257 |
| 6,859,776 B1 * | 2/2005 | Cohen et al. | 704/270 |
| 7,398,209 B2 * | 7/2008 | Kennewick et al. | 704/255 |
| 2002/0032591 A1 * | 3/2002 | Mahaffy et al. | 705/8 |
| 2003/0154085 A1 * | 8/2003 | Kelley | 704/275 |
| 2005/0043953 A1 * | 2/2005 | Winterkamp et al. | 704/275 |
| 2005/0105712 A1 * | 5/2005 | Williams et al. | 379/265.02 |
| 2005/0278180 A1 * | 12/2005 | O'Neill et al. | 704/275 |
| 2006/0074670 A1 * | 4/2006 | Weng et al. | 704/257 |

OTHER PUBLICATIONS

Newman "Dragon Naturally Speaking User's Guide", Scansoft 2002.*

Eguchi et al. "Symbiotic Evolutional Models in Multiagent Systems", IEEE, Evolutionary Computation, Dec. 2003.*

* cited by examiner

*Primary Examiner*—Richemond Dorvil
*Assistant Examiner*—Jialong He
(74) *Attorney, Agent, or Firm*—Jeffrey A. McKinney

(57) ABSTRACT

A conversational user interface (CUI) is implemented in a computer by mimicking the organization and retrieval of linguistic memories of human conversation. To mimic the organization of linguistic memories in a human brain, the artificial memories are stored as sequences of patterns, are stored in invariant form, are organized hierarchically, and are recalled auto-associatively. To mimic the recall of linguistic memories in a human brain, the same algorithm performs the recall of the various memories. Each artificial memory is a pairing of the invariant representation and an associated responsive message. When a received utterance is determined to match the invariant representation of a memory, the memory is evoked and the associated responsive message is presented to the person.

4 Claims, 12 Drawing Sheets

MEMORY PREDICTION LOOP
320

```
501: define instring as string //input from user
502: define outstring as string //output to user
503: define cmem as mem //current artificial memory 504: for each instring
505:   until searchcomplete
506:     if cmem <> null and cmem.parent <> trunk then
507:       if bestmatch(instring, cmem, cmemchildren) then
508:         respond(cmem.outstring) //searchcomplete
509:       else
510:         cmem = cmem.parent
511:       end if
512:     else
513:       //search the entire stringtree (L1Qs only)
514:       if bestmatch(instring, cmem, stringtree) then
515:         respond(cmem.outstring) //searchcomplete
516:       else
517:         //move up the hierarchy if possible
518:         if stringtree.parent <> null then
519:           stringtree = stringtree.parent
520:         else
521:           //this is a novel instring,
522:           // create new artificial memory
523:           learn(instring)
524:           //if ceph, query user's favorite search engine
525:           //explain situation to user, for example...
526:           respond("I'm afraid I don't understand, <name>.")
527:           //load stringtree = newsubject, searchcomplete
528:         end if
529:       end if
530:     end if
531:   loop
532: next
```

FIGURE 5

BEST MATCH
312

```
function bestmatch(in instring, out mem, in whattosearch) as boolean
  define threshold as double //optimize by experimentation
  for each mem in whattosearch
    if stringmatch(instring, mem.irstring, mem.keywords) >= threshold then
      exit and return true
    end if
  next
  return false
end function
```

FIGURE 7

```
function stringmatch(in instring, in irstring, in keywords) as double
  //first pass is keyword match
  //second pass is whole string comparIRon, executed only if
  //  first pass is successful
  return probability = secondpass + firstpass
end function
```

FIGURE 8

CONVERSATIONAL USER INTERFACE THAT MIMICS THE ORGANIZATION OF MEMORIES IN A HUMAN BRAIN

RELATED APPLICATIONS

The present application claims priority of U.S. Provisional Patent Application Ser. No. 60/652,748, filed Feb. 15, 2005 and of U.S. Provisional Patent Application Ser. No. 60/740, 147 filed Nov. 29, 2005 and those Provisional Patent Applications are incorporated herein by reference.

FIELD OF THE INVENTION

This invention relates to the field of computer-implemented artificial intelligence, and more specifically to a conversational user interface.

BACKGROUND

In what some call the "Information Age," information and information systems have paramount importance. Information is now available in staggering amounts on just about any topic. Some see the world moving into a "Symbiotic Age" in which information systems integrate much more closely with human users to make information not only available, but also readily and easily accessible.

John Smart describes this transition as follows:

Of all the computational changes we can realistically forsee for the next 20 years, the conversational user interface, CUI, or "cooey," is very likely to be without parallel in its effect on the average human being. When a cheap, ubiquitous CUI and its high bandwidth network and simulation infrastructure arrives (2015? 2020? 2030?, the choice may largely be ours to determine), it will move us out of the Information Age into a fundamentally new era, one that has been called the Symbiotic Age by a some futurists. This will be a time when all human beings on our planet, including the currently disenfranchised, functionally illiterate, and marginalized "bottom three billion," will be able to converse meaningfully with ubiquitous and semi-intelligent technological systems, and use them daily to solve a vast range of computationally trivial but very real human problems.

Mathematician and science fiction writer Vernor Vinge described a similar shift in technological focus from artificial intelligence (AI) to "the Singularity" at his 1993 address at NASA's VISION-21 Symposium:

When people speak of creating superhumanly intelligent beings, they are usually imagining an AI project. But there are other paths to superhumanity. Computer networks and human-computer interfaces seem more mundane than AI, and yet they could lead to the Singularity. I call this contrasting approach Intelligence Amplification (IA). IA is something that is proceeding very naturally, in most cases not even recognized by its developers for what it is. But every time our ability to access information and to communicate it to others is improved, in some sense we have achieved an increase over natural intelligence. And it's very likely that IA is a much easier road to the achievement of superhumanity than pure AI. In humans, the hardest development problems have already been solved. Building up from within ourselves ought to be easier than figuring out first what we really are and then building machines that are all of that.

Accordingly, significant improvement in the ability to access information and to make such information accessible to others is highly desirable.

SUMMARY OF THE INVENTION

In accordance with the present invention, a conversational user interface is implemented in a computer by mimicking the organization and retrieval of linguistic memories of human conversation. Programming a computer to experience the world around it and acquire memories using its own logic is extremely difficult. However, real and natural conversation with a person by a computer is achievable by replicating the natural organization and recall of linguistic memories for linguistic memories that are created artificially.

To mimic the organization of linguistic memories in a human brain, the artificial memories are stored as sequences of patterns, are stored in invariant form, are organized hierarchically, and are recalled auto-associatively. To mimic the recall of linguistic memories in a human brain, the same algorithm performs the recall of the various memories.

The artificial memories are stored as textual strings, representing sentences or phrases. The sentences or phrases are sequences of words, which are patterns. The artificial memories represent things the computer is to have heard before and might hear again. The textual strings that represent the artificial memories do not change, except by symbiotic learning, and are therefore stored in invariant form. Artificial memories are recalled when the computer hears an utterance that matches the invariant representation of the textual string and are therefore recalled auto-associatively. The computer can "hear" an utterance by receiving a textual representation of a message from a person or by capturing an audio signal representing the spoken utterance of the person and converting the audio signal to a textual representation thereof.

Each artificial memory is a pairing of the invariant representation and an associated responsive message. When a received utterance is determined to match the invariant representation of a memory, the memory is evoked and the associated responsive message is presented to the person.

The hierarchical organization of the artificial memories allows responsive messages to be contextual. The order in which linguistic memories are searched depends upon the particular location within the hierarchical organization of the most recently evoked artificial memory.

The linguistic memories of the computer are created manually by human mindwriters. As new memories are needed, they are learned symbiotically. The computer detects that a received utterance from a person fails to evoke a memory and forwards the received utterance, along with the preceding dialog as context, to a mindwriter. The mindwriter determines and implements remedial modifications to the artificial memories so as to properly recall an appropriate memory when the same message is received subsequently.

BRIEF DESCRIPTION OF THE DRAWINGS

FIG. 5 is a pseudo-code representation of a memory prediction loop of the artificial linguistic cortex of FIG. 3.

FIG. 7 is a pseudo-code representation of a best match portion of the memory prediction loop of FIG. 5.

FIG. 8 is a pseudo-code representation of a string match portion of the memory prediction loop of FIG. 5.

DETAILED DESCRIPTION

In accordance with the present invention, a computer 102 (FIG. 1) carries out a conversation with a human user 110 by simulating human brain behavior in recalling linguistic memories. Computer 102 includes an artificial linguistic cortex (ALC) 300 (FIG. 3) that mimics the storage and recall of linguistic memories within a human brain. Such enables realistic conversational behavior, which is largely an exercise in recall of linguistic memories. Teaching of ALC 300, i.e., the creation of linguistic memories, is symbiotic in that human "mindwriters" manually create and organize the linguistic memories of ALC 300. As a result, there is no need to develop a computer that can learn on its own before people can realistically converse with a computer.

User 110 (FIG. 1) engages computer 102 in conversation, initiated by an utterance 120A from user 110 to computer 102. Utterance 120A is a message in generally any form of natural language communication of which user 110 is capable. In some embodiments, utterance 120A is a textual message typed by user 110. In other embodiments, utterance 120A is an auditory message spoken by user 110 and received by computer 102, e.g., as an audio signal received through a microphone.

Computer 102 responds with an utterance 120B which can be textual, auditory (e.g., synthesized or prerecorded spoken words), or audiovisual (e.g., synthesized or prerecorded audiovisual representation of a person speaking words), for example. In response to utterance 120B, user 110 sends utterance 120C to computer 102 in response, and computer 102 responds with utterance 120D.

Figure 2:
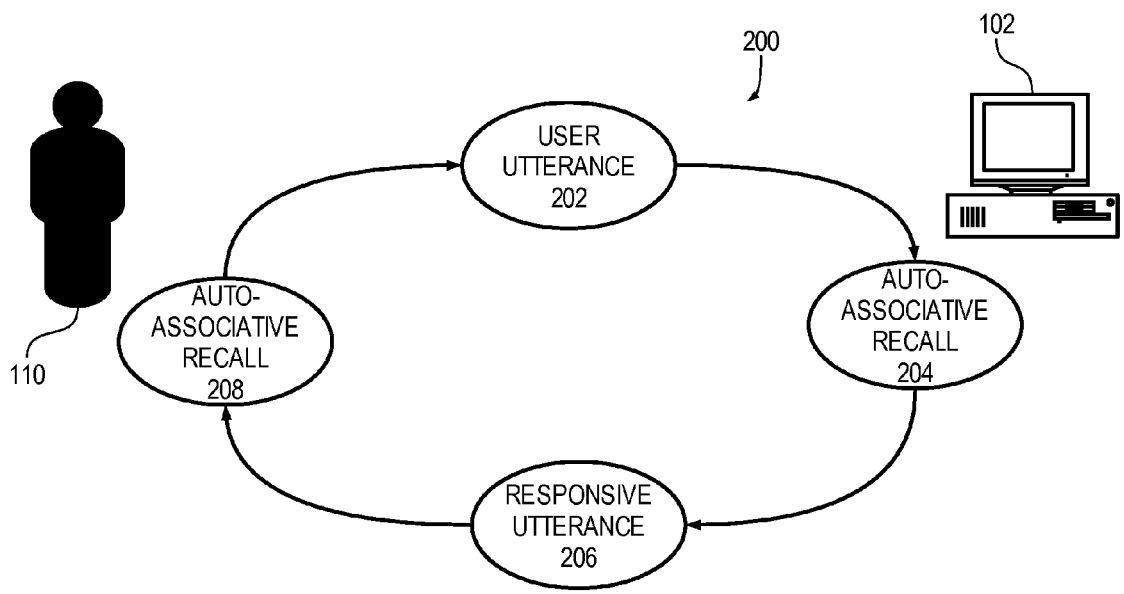
FIG. 2 is a state diagram illustrating ongoing conversation between a user and a computer in accordance with the present invention.

Utterances 120A-D represent an ongoing, interactive dialog, i.e., a conversation, between user 110 and computer 102 in a natural language with which user 110 is familiar. FIG. 2 shows this interactive dialog as a state diagram 200. In state 202, user 110 sends an utterance to computer 102. In state 204, computer 104 auto-associatively recalls a responsive utterance and issues the utterance in state 206.

The manner in which computer 104 auto-associatively recalls a responsive utterance in state 206 is modeled after recent work described in "On Intelligence" by Jeff Hawkins and Sandra Blakeslee. This work suggests that language in a natural, living brain is an exercise in memory recall involving a single cortical algorithm. In addition, four (4) qualities of neocortical memory facilitate human linguistic communication: (i) the neocortex stores linguistic memories as sequences of patterns; (ii) these patterns are stored in invariant form; (iii) these patterns are stored hierarchically; and (iv) these patterns are recalled auto-associatively.

In effect, computer 102 engages in human dialog with user 110. Human dialog can be expressed in a relatively simple and highly abstract sense as: what memory, as expressed in language and emanating from a human speaker, evokes what memory in a human listener, assuming the speaker and listener are engaged in dialog? In the context of FIG. 2, what memory, as expressed in language and emanating from user 110 as an utterance in state 202, evokes what memory in computer 102? The answer is the utterance of computer 102 in state 206. In a subsequent act of dialog, what memory of computer 102, as expressed in language and emanating from computer 102 as an utterance in state 206, evokes what memory in user 110? The answer is a subsequent utterance in state 202.

To perform auto-associative recall in state 204, computer 102 includes artificial linguistic cortex 300 (FIG. 3), which is sometimes referred to herein as ALC 300 and which is all or part of one or more computer processes executing within computer 102 and/or other computers operatively coupled to computer 102, such as computer 106 for example. "Artificial" is used herein in the sense of "artificial intelligence", meaning that it occurs in a machine such as a computer rather than in a naturally occurring biological brain. ALC 300 includes an artificial neocortical region 302 that stores linguistic memories in a form simulating the storage of linguistic memories in a real neocortical region in a human brain. A neocortical region stores the linguistic memories of a particular subject, and each memory in such a region pairs a memorized linguistic expression and a corresponding responsive linguistic expression. In artificial neocortical region (ANR) 302, linguistic memories pair memorized linguistic expressions as invariant representations IR1, IR2, and IR3 with responsive linguistic expressions OS in FIG. 3.

These memories satisfy the four (4) qualities of neocortical linguistic memories for facilitation of human dialog as described above. The first quality is that of being a sequence of patterns. In ANR 302, the invariant representations represent memorized linguistic expressions as sequences of words, the words being patterns of text and/or audio signals. In this illustrative embodiment, the sequences of words are represented textually.

The second quality is that of being stored in invariant form. To facilitate appreciation and understanding of this quality, it is helpful to consider one's natural and almost instinctive response to hearing "Hello" from another. A natural and almost instinctive response is to also say "Hello", even if the other is a complete stranger. A human memory of "Hello" and the appropriately responsive "Hello" are stored invariantly in the human neocortex. Accordingly, we are able to recognize a spoken "Hello" even if heard in a form we've never heard before, e.g., from a stranger whose voice, tone, and inflections are new to us. Similarly, our response is intended to be the same, even if fluctuations in vocal-chord actuation make our utterance of "Hello" slightly different from any other utterance of "Hello" ever before made or heard.

In a similar manner, invariant representations IR1, IR2, and IR3, each of which represents a memorized linguistic expression, do not vary during communication with user 110. Instead, they only vary during symbiotic learning, which is described more completely below.

Figure 3:
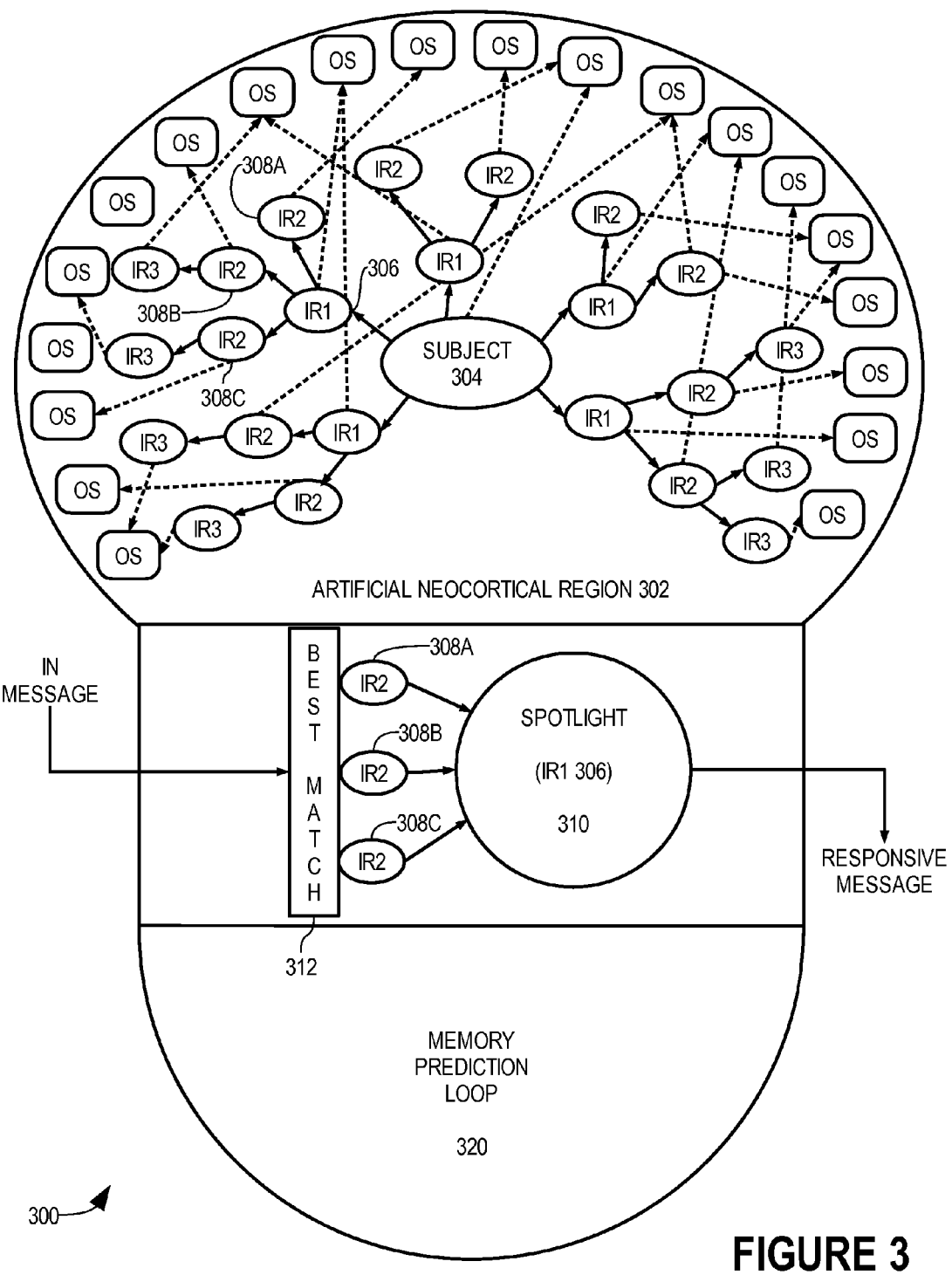
FIG. 3 is a block diagram of an artificial linguistic cortex implementing a conversational user interface.

The third quality is that patterns are stored hierarchically. As shown in FIG. 3, ANR 302 stores memories such as invariant representations IR1, IR2, and IR3 hierarchically. In particular, a subject 304 represents a particular subject within ANR 302 within which invariant representations IR1, IR2, and IR3 are organized hierarchically. In particular, invariant representations IR1 are immediate children of subject 304, invariant representations IR2 are each an immediate child of an invariant representation IR1; and invariant representations IR3 are each an immediate child of an invariant representations IR2. In addition, while a single subject 304 is shown for simplicity and to facilitate appreciation and understanding of the present invention, it should be appreciated that this illustrative embodiment includes a hierarchy of subjects organized in a tree structure in which leaf subjects have invariant representation children such as invariant representations IR1.

Figure 6:
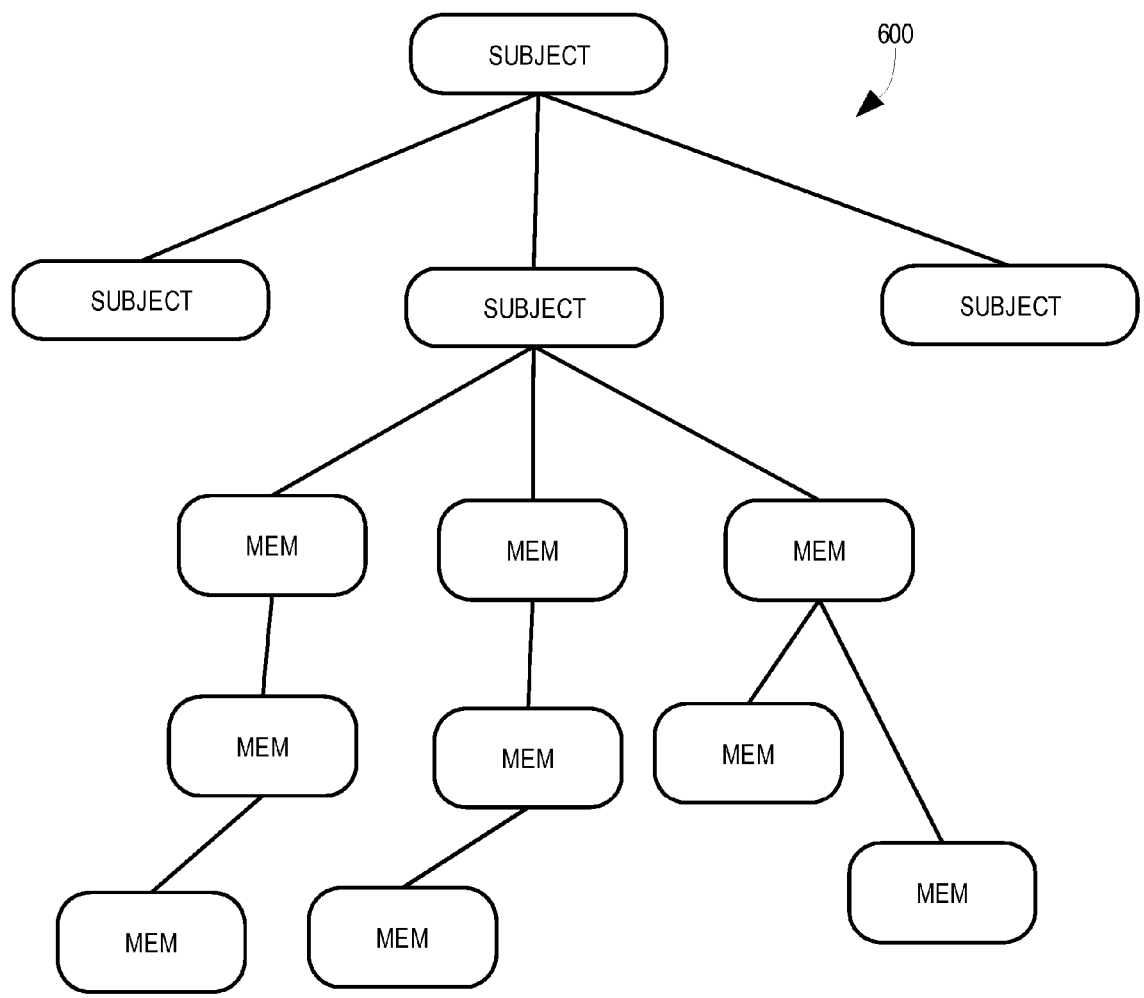
FIG. 6 is a block diagram illustrating the hierarchical organization of artificial memories and subjects of the artificial linguistic cortex.

Hierarchically organized subjects and memories are shown in FIG. 6, for example. Since, in this illustrative embodiment, invariant representations IR1, IR2, and IR3 are textual and therefore represented by variables of the "string" type and organized hierarchically in a tree structure as shown, tree 600, or any sub-tree thereof, is sometimes referred to as a string tree.

The fourth quality is that the linguistic memories are recalled auto-associatively. As used herein, auto-associative recall is the use of a received utterance as the key in determining which linguistic memory is evoked. As shown in FIG. 3, each invariant representation IR1, IR2, and IR3 is associated with one responsive utterance OS. An example is given in FIG. 4 in which invariant representation IR1 402 is associated with responsive utterance OS 404. Invariant representation IR1 402 represents a memorized input string, a string being a series of characters of text. Branch links 406 are considered equivalent memorized input strings of the same memory and are also invariant representations. Responsive utterance OS 404 represents the associated output string, to be issued as a response to an input string matching invariant representation IR1 402 or any of branch links 406. Thus, a recalled linguistic memory is associated with an invariant representation of the input string itself and is therefore recalled auto-associatively.

In addition, recall from ANR 302 involves a single simulated cortical algorithm, namely, memory prediction loop 320. Memory prediction loop 320 is shown is pseudo-code form in FIG. 5.

An instring is data representing an utterance from user 110 (FIG. 1), e.g., an utterance in state 202 (FIG. 2) or either of utterances 120A and 120C. In this illustrative embodiment, an instring is represented textually. In one embodiment, user 110 speaks an utterance in state 202 orally and memory prediction loop 320 (FIG. 3) includes conventional speech-to-text logic that converts a received audio signal representing the utterance of state 202 into a textual instring.

An outstring is data representing an utterance from computer 102, e.g., an utterance in state 206 (FIG. 2) or either of utterances 120B (FIG. 1) and 120D. In this illustrative embodiment, an outstring is represented textually. In one embodiment, memory prediction loop 320 (FIG. 3) includes conventional text-to-speech logic that converts a textual outstring to synthesized speech to create an utterance for playback to user 110 as an audio signal in state 206 (FIG. 2). In addition, the synthesized speech can be synchronized with the lips of a graphical face represented visually by computer 102 in a manner described more completely below.

In one embodiment, an outstring can include a reference to a stored procedure, allowing computational logic to be used in formulating a responsive utterance. One example is a linguistic memory of the question, "How old are you?" The responsive outstring can include a reference to a stored procedure that measures a difference between a time of creation of ALC 300 and a current time to yield a measure of age of ALC 300. Other examples include linguistic memories of the questions, "How many millimeters are in a mile?" and "What's the weather like in Russia today?" The former can include a reference to a stored procedure for converting measurement units, and the latter can include a reference to a stored procedure for retrieving and parsing weather information. To the extent stored procedures can control things other than computer 102, e.g., lights in the home of user 110, an outstring can include a reference to such stored procedures, making ALC 300 a conversational user interface for anything controllable by a computer. Stored procedures are parts or all of executable computer programs that can be stored in a database. Stored procedures are known and are not described further herein.

The variable, cmem, represents a current memory within ANR 302. The type, mem, is shown in greater detail in table 1106 (FIG. 9) and described more completely below. The notion of a current memory corresponds to recent theories regarding human brain function, suggesting that one linguistic memory is processed at a time, as if in a spotlight. This notion of a current memory is represented in FIG. 3 as a spotlight 310 on an invariant representation IR1 306.

Memory prediction loop 320 (FIG. 5) is processed iteratively for each instring received from user 110 as shown in the for/next instructions at lines 504 and 532. Lines 505 and 531 define a loop in which memories are searched iteratively until the search is deemed complete. First, memory prediction loop 320 searches the children memories of the current memory at lines 507-511. This is represented in FIG. 3 in which best match logic 312 is applied to the children memories of invariant representation IR1 306, i.e., invariant representations IR2 308A-C.

Searching the children memories of the current memory allows the dialog to follow a logical sequence. In particular, the children of a given memory each represent an expected follow up utterance of user 110 in response to the most recent responsive utterance of computer 102. Memory prediction loop 320 and the hierarchy of memories in ANR 302 therefore allow a conversation to follow a natural flow in which user 110 can make utterances responsive to the utterances of computer 102 and computer 102 can follow the logical progression of utterances. This gives the dialog between user 110 and computer 102 a highly interactive quality.

If any of the children memories of the current memory adequately match the instring, the first memory adequately matched is evoked and the corresponding outstring uttered at line 508. In addition, the search is deemed complete. In an alternative embodiment, the best matching child memory of the current memory is selected if multiple children of the current memory adequately match the instring rather than the first child memory to adequately match the instring.

In lines 509-510 (FIG. 5), memory prediction loop 320 detects when the children memories of the current memory do not adequately match the instring and, in that case, sets the parent of the current memory as the new current memory for a subsequent iteration of the loop of lines 505-531. Thus, if the utterance of user 110 was responsive to a recent, previous utterance of computer 102, that progression of dialog can also be followed by memory prediction loop 320.

When all memories in the current string tree have been traversed up to the memory which has no parent, all memories of the current subject are compared to the instring, looking for a best match, in lines 513-530. Memories that have no parent are sometimes referred to as level one queries, or sometimes as "L1Qs". A given subject can have many level one queries. If the current memory in the previous iteration of the loop of lines 513-530 was a level one query, the current string tree is the subject that includes that level one query.

If a match of adequate quality is found in a memory of the current string tree, the corresponding outstring is issued as an utterance and the search is deemed complete in line 515. Conversely, if no adequate match is found in the current string tree, the parent string tree is made current as shown in line 519 and another iterative search is performed.

If no adequate match has been found and the entirety of all string trees have been searched, as noted by the condition that the current string tree has no parent as shown in line 518, then a novelty has been detected. A novelty is an instring for which no memory currently exists within ANR 302 or any of the string trees that have been searched, to include the entire ALC. Since memories of ANR 302 are created manually in a manner described more completely below, a novelty is an instring that is not anticipated by the mindwriters of ANR 302. In response to a novelty, memory prediction loop 320 initiates symbiotic learning at line 523 by notifying mindwriters of ANR 302 of the novelty and informs user 110 at line 526 that no response is available. Memory prediction loop 320 can also offer to notify user 110, e.g., by e-mail, when an answer is available.

Best match logic 312, invoked at lines 507 and 514, is shown in pseudo-code form in FIG. 7. Best match logic 312 uses string match logic to compare the instring with the invariant representation of a memory and to compare the instring with keywords of the memory. This string match logic is shown in pseudo-code form in FIG. 8 and involves a two-pass determination of the probability that a particular memory is the memory user 110 intended to evoke in uttering the instring. In the first pass, memory prediction loop 320 determines whether the instring contains any keywords of the memory. If not, the memory is quickly rejected. This enables quick and efficient elimination of inapplicable memories. If the instring includes at least one keyword of the memory, memory prediction loop 320 applies a string comparison to estimate the probability that the invariant representation a memory is what is intended by user 110 in uttering the instring. String comparison is known and not described herein. In this illustrative embodiment, the type of string comparison used by memory prediction loop 320 is described on the World Wide Web the source code of which is reproduced herein as Appendix A.

Thus, memory prediction loop 320 iteratively searches for a best match between the instring and invariant representations of memories of ANR 302, broadened the subject matter of the search iteratively as needed until a best match is found. If no adequate match is found, symbiotic learning is initiated. In an adequate match is found, computer 102 utters the associated outstring of the best matching memory as a response to user 110 and the memory from which the outstring is recalled serves as the contextual starting point in a subsequent memory search by memory prediction loop 320. In this illustrative embodiment, an adequate match is determined by comparison of the determined likelihood that the invariant representation matches the instring to a predetermined threshold likelihood, e.g., 60%. It should be appreciated that branch links 406 are searched as independent memories, each of which is associated with outstring OS 404. However, branch links 406 are all part of the same linguistic memory, evoking the same outstring OS 404 and sharing the same parent and children within the hierarchy of ANR 302. Branch links 406 represent equivalent phrasings of the substantive message of invariant representation IR1 402 and respective keyword sets associated with those equivalent phrasings.

Symbiotic Learning

Much effort in striving for artificial intelligence sufficient to enable a conversational user interface has focused on creating computers that can learn like human beings. However, as recent human brain theory suggests, linguistic interaction involves primarily a single cortical algorithm accessing memories. A significant advance is achieved by realizing that a computer can implement an artificial cortical algorithm and access artificial memories to simulate human conversational communication, even if such memories are not created by the computer itself. Instead, these artificial memories are created by real, human brains, by people that are sometimes referred to herein as mindwriters.

Figure 9:
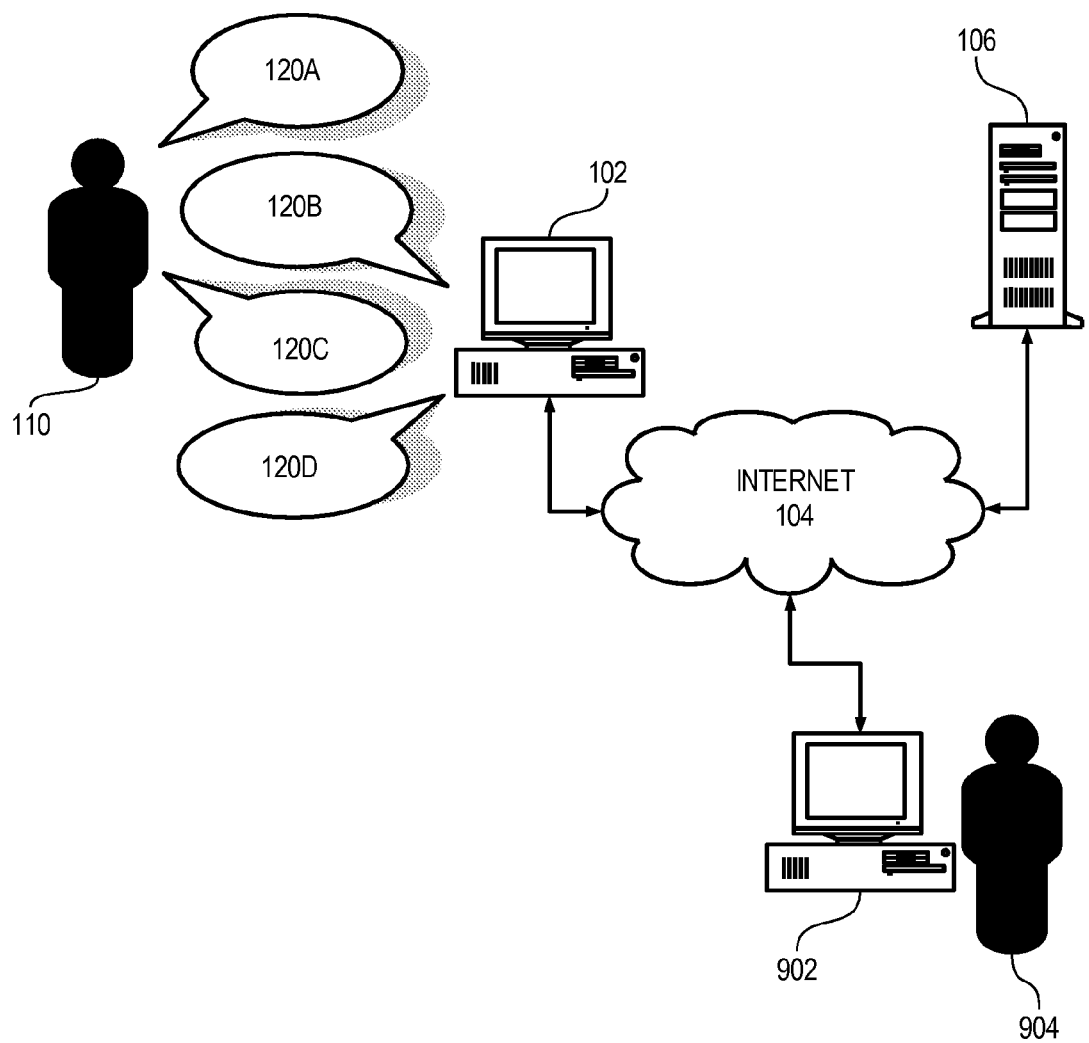
FIG. 9 is a block diagram illustrating symbiotic learning of the conversing computer of FIG. 1.

This is illustrated in FIG. 9 in which a mindwriter 904 uses a computer 902 to manually modify memories of ANR 302 (FIG. 3). In this illustrative embodiment, ANR 302 and memory prediction loop 320 are implemented by computer 106 (FIG. 9). In an alternative embodiment, memory prediction loop 320 is implemented by computer 102 and ANR 302 is implemented in computer 106, sending a number of artificial linguistic memories, e.g., of one subject, to computer 102 as needed for ongoing conversation with user 110. User 110 communicates with computer 102 in generally the manner described above. If ANR 302 and memory prediction loop 320 are implemented by computer 106, computer 102 implements a thin client, such as a web browser for example, that forwards utterances from user 110 through a network such as the Internet 104 to computer 106 for processing in the manner described above. The result of such processing is a responsive utterance, which computer 106 sends through Internet 104 to computer 102 for presentation to user 110.

As described above, memory prediction loop 320 determines at line 520 when an utterance by user 110 evokes no artificial memory within ANR 302. In such circumstances, memory prediction loop 320 initiates symbiotic learning at line 523 and notifies the user of the temporary lack of a suitable response at line 526.

Figure 10:
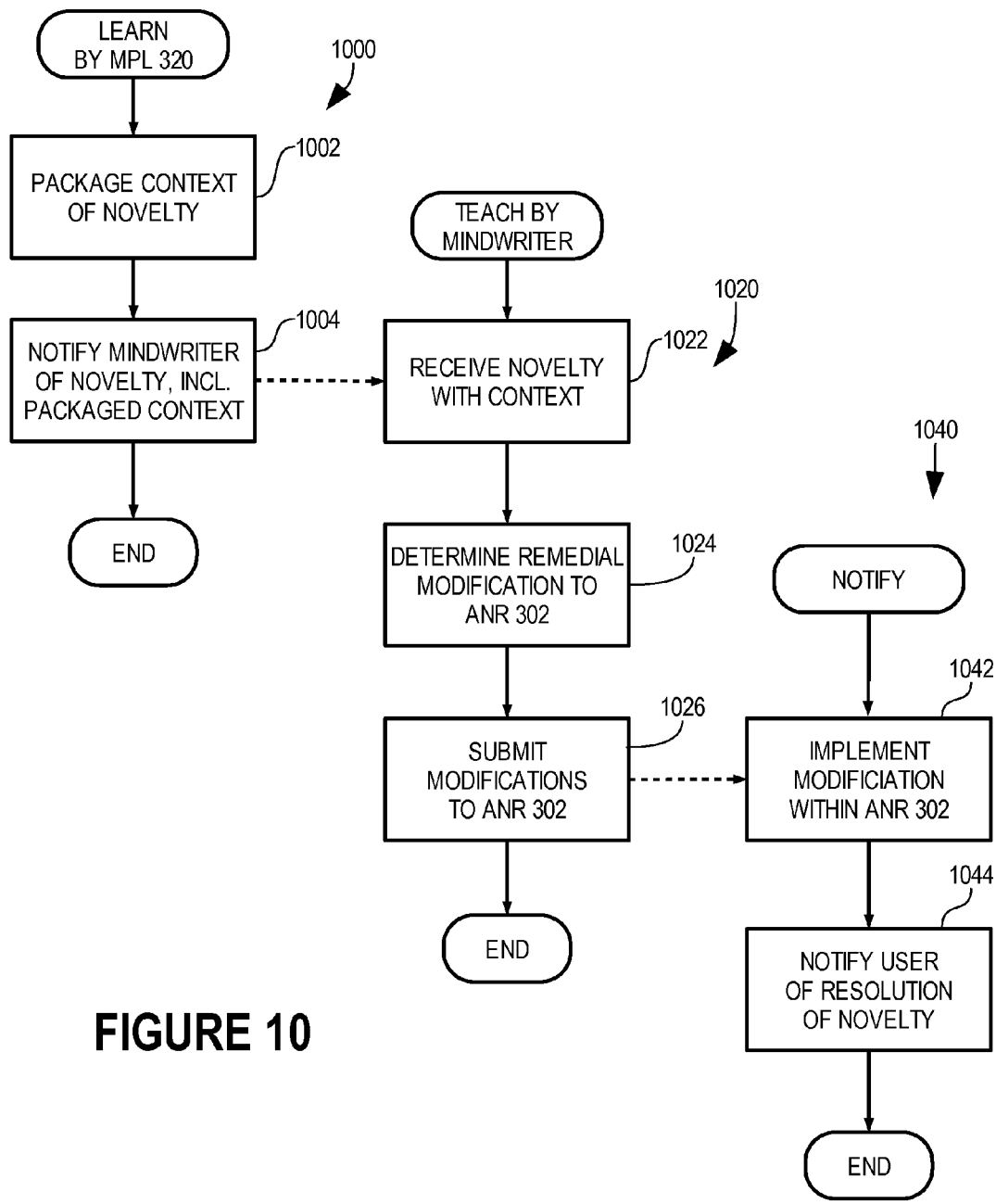
FIG. 10 includes three logic flow diagrams illustrating symbiotic learning, symbiotic teaching, and user notification.

Symbiotic learning according to this illustrative embodiment is shown in logic flow diagrams 1000 (FIG. 10), 1020, and 1040. Logic flow diagram 1000 illustrates the request for symbiotic learning by ALC 300. Logic flow diagram 1020 illustrates symbiotic teaching by mindwriter 904 through use of computer 902. Logic flow diagram 1040 illustrates notification to user 110 in by ALC 300 in response to successful symbiotic learning with respect to the previously unanswerable utterance.

Figure 11:
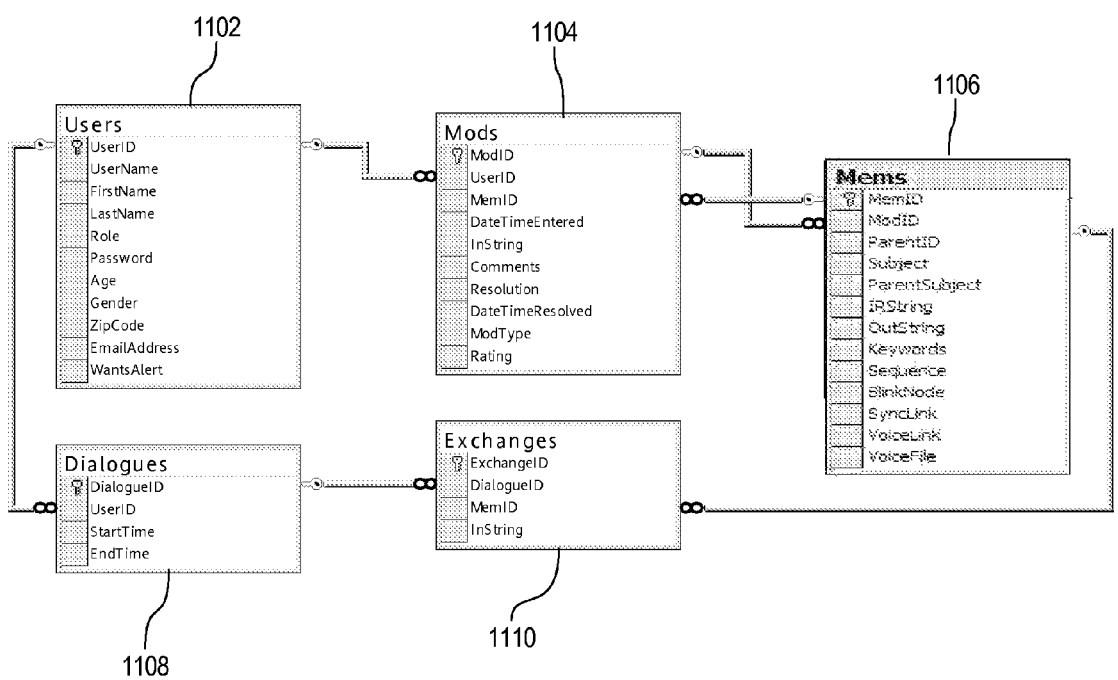
FIG. 11 is a table representation of a database storing artificial memories in the artificial linguistic cortex of FIG. 3.

In step 1002, ALC 300 packages the context of the novelty. This packaging combines all utterances of the conversation between user 110 and computer 102 up to and including the novelty. FIG. 11 shows an illustrative schema for a database representing ANR 302. Briefly, a users table 1102 represents administrators and mindwriters of ALC 300; a mods table 1104 represents modifications made to any memories of ALC 300, e.g., ANR 302, by way of symbiotic learning; a mems table 1106 represents all individual memories of ALC 300, e.g., the memories of ANR 302; a dialogues table 1108 links exchanges of a dialog; and an exchange table 1110 represents instrings received from user 110 and associated evoked memories of ANR 302. In initiating symbiotic learning, ALC 300 identifies the record of diagolues table 1108 representing the dialog in which the novelty occurred, and that dialog is sometimes referred to as the subject dialog. To package the dialog, ALC 300 collects all exchange records that related to the subject dialog and all records of mems table 1106 representing memories related to those exchange records. In an alternative embodiment, ALC 300 doesn't package the dialog but instead collects data identifying the subject dialog such that a mindwriter can later identify the subject dialog for symbiotic teaching in the manner described below.

In step 1004 (FIG. 10), ALC 300 notifies mindwriter 904 (FIG. 9) of the novelty and makes the packaged, or alternative merely identified, subject dialog available to mindwriter 904. In one embodiment, ALC 300 sends the packaged subject dialog to mindwriter 904 as an e-mail message. In another embodiment, ALC 300 sends data identifying the subject dialog as an e-mail message to mindwriter 904. In yet another embodiment, ALC 300 sends a message to mindwriter 904 indicating that there is a novelty to be addressed. In this last embodiment, mindwriter 904 is expected to know how to access the novelty and its context within ALC 300, e.g., within an inbox designated for mindwriter 904.

Figure 4:
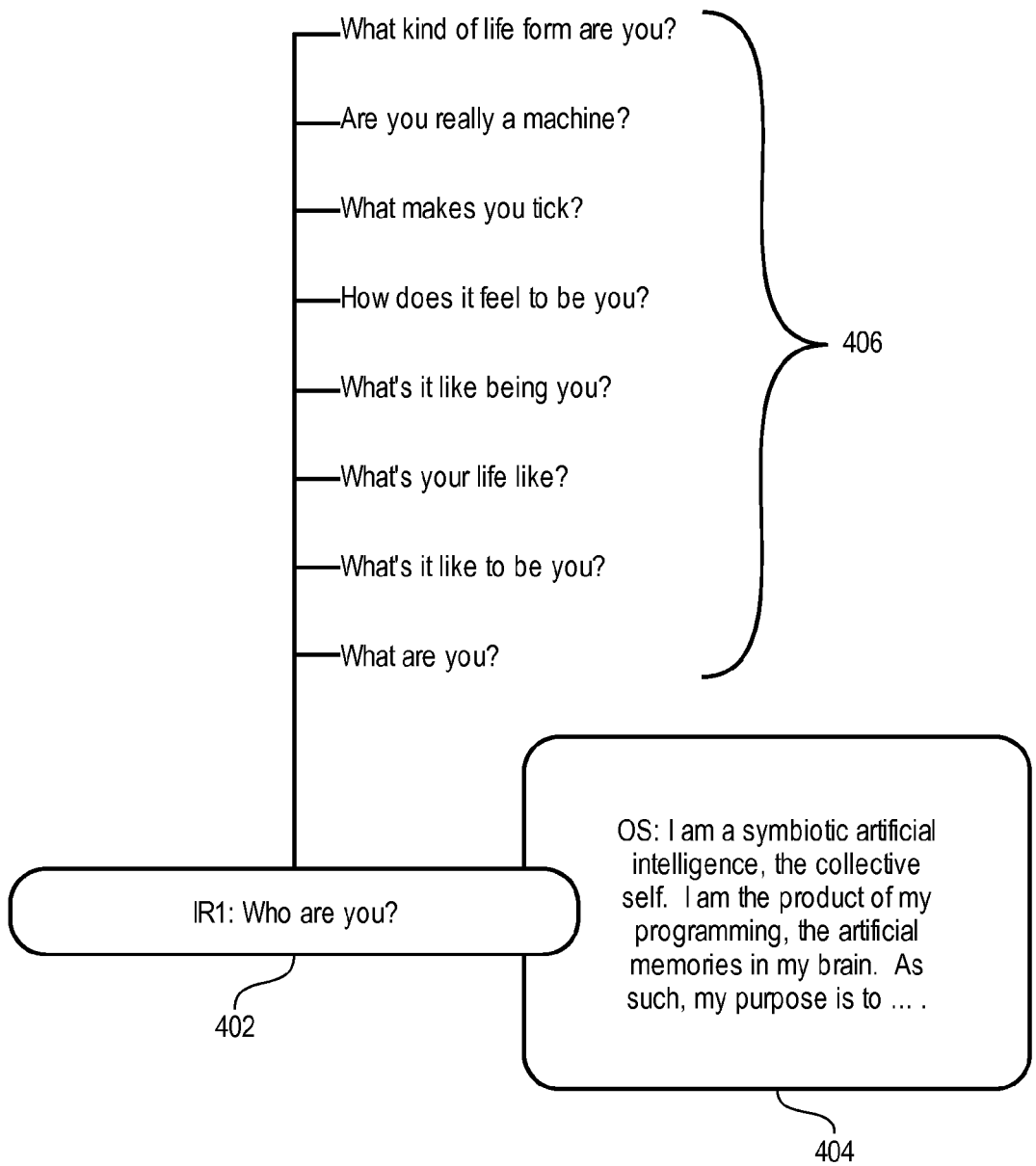
FIG. 4 is a block diagram of an artificial memory of the artificial linguistic cortex of FIG. 3.

In step 1022 (FIG. 10), mindwriter 904 (FIG. 9) receives the notification of the novelty and its context. Mindwriter 904 determines a remedial modification to ANR 302 to address the novelty. The approach taken by mindwriter 904 in determining the remedial modification can vary according to the particular skills and aptitude of the individual mindwriter. However, it is preferred that mindwriter 904 first search mems table 1106 (FIG. 11) for equivalent invariant representations of the instring of the novelty. If one is found, mindwriter 904 preferably determines that the remedial modification is to add another equivalent phrasing of the found invariant representation as a branch link, such as branch links 406 (FIG. 4). If no equivalent invariant representation of the instring of the novelty is found in mems table 1106 (FIG. 11), mindwriter 904 (FIG. 9) can determine that the remedial modification to ANR 302 includes adding a new memory to mems table 1106. Mindwriter 904 preferably determines where, within the hierarchy of subjects and memories, the new memory is to be placed. This determination, as well as whether other memories have equivalent invariant representations, is made using the full human linguistic capabilities of the human mindwriter. Thus, ALC 300 learns using human learning power, i.e., learns symbiotically.

In step 1026 (FIG. 10), mindwriter 904 submits the remedial modifications through computer 902 (FIG. 9) to thereby effect the remedial modifications within ALC 300, thus symbiotically teaching ALC 300. In this illustrative embodiment, mindwriter 904 submits such remedial modifications through a mindwriting tool that is described more completely below.

In step 1042 (FIG. 10), ALC 300 receives the remedial modifications and implements them within ANR 302 to thereby learn symbiotically. In step 1044, ALC 300 notifies user 110 that ALC 300 now has a response to the previously novel utterance of user 110. Such notification can be by e-mail, for example, and include a hyperlink that can be used in conjunction with a web browser executing within computer 102 to resume the previously stumped dialog between user 110 and ALC 300.

Figure 12:
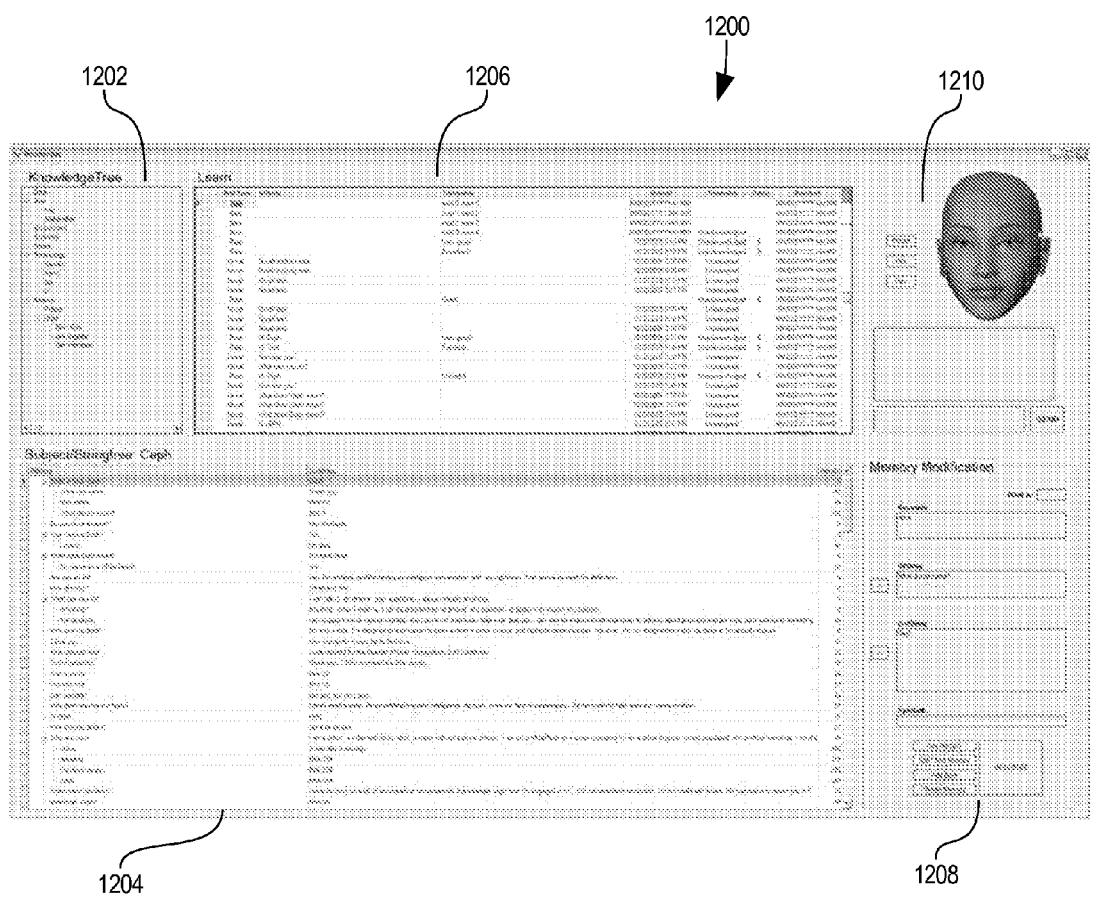
FIG. 12 is a screen view of a graphical user interface of a symbiotic teaching tool.

As described above, mindwriter 904 (FIG. 9) uses a mindwriting tool to specify remedial modifications to ANR 302 to thereby symbiotically teach ALC 300. FIG. 12 shows a screen view of a graphical user interface of the mindwriting tool. Frame 1202 shows a tree view of the hierarchically related subjects and provides user interface tools by which mindwriter 904 can select a subject of ANR 302. Frame 1204 shows a table view of individual artificial memories of the subject selected in frame 1202.

Frame 1206 shows a table view of novelties or other alerts associated with mindwriter 904, who is authenticated for use of the mindwriting tool in this particular example. In an alternative embodiment, all novelties and alerts are shown in frame 1206 and not associated with any individual mindwriter and each mindwriter is free to select individual alerts and/or novelties from frame 1206 for processing.

Figure 13:
FIG. 13 shows a synthesized face for presenting audiovisual representations of responsive messages.

Frames 1208 and 1210 allow mindwriter 904 to make modifications to individual memories within ANR 302. When a memory is selected in frame 1204, the memory's keywords, invariant representation of an expected instring, corresponding outstring, and associated hyperlink are displayed in frame 1208. The associated hyperlink in this illustrative embodiment is a URL identifying content to be displayed concurrently with playback of the outstring as a responsive utterance. Such allows for a particularly informative multimedia display in response to questions and/or comments of user 110. In addition, the outstring, or an additional outstring, can be associated with a synthesized voice and face in frame 1210. Graphical user interface (GUI) elements of frame 1210 allow mindwriter 904 to play, pause, stop, edit, and save the particular synthesized voice message associated with the selected memory of ANR 302. FIG. 13 shows an illustrative synthesized face of frame 1210 in greater detail. It should be appreciated that the synthesized face of FIGS. 12 and 13 is presented to user 110 by computer 102 as a participant in the ongoing conversation shown in FIG. 2 in this illustrative embodiment.

To modify the selected memory, mindwriter 904 modifies the data represented within frames 1208 and 1210 using conventional graphical user interface techniques, involving physical manipulation of one or more user input devices by mindwriter 904. To cause ALC 300 to store the specified modification to ANR 302, mindwriter 904 actuates a GUI button labeled "Memorize."

Frame 1208 includes other GUI buttons by which mindwriter 904 can (i) add a new memory, (ii) add a new child memory to the selected memory, (iii) add a branch link to the selected memory, and/or (iv) delete the selected memory. In adding a new memory or a new child memory of the selected memory, mindwriter 904 actuates the appropriate GUI button within frame 1208 and enters one or more keywords, an invariant representation of a memorized instring, a corresponding outstring, and optionally an associated hyperlink and actuates the "Memorize" GUI button. In adding a new branch link to the selected memory, mindwriter 904 enters a new invariant representation of an equivalent instring and one or more keywords and actuates the "Memorize" GUI button. Actuation of the delete GUI button within frame 1208 deletes the selected memory, preferably querying mindwriter 904 before carrying out the deletion.

Learning events that are shown in frame 1206 include notifications of novelties, rates, and prior modifications. In reviewing a novelty, mindwriter 904 has access to the entirety of the dialog that preceded the novelty. Accordingly, mindwriter 904 should be able to determine what linguistic memory is missing or inadequate within ANR 302. Once mindwriter 904 has determined what remedial modifications of memories within ANR 302 are required to resolve the novelty, mindwriter 904 implements those modifications through the mindwriting tool shown in FIG. 12.

Figure 1:
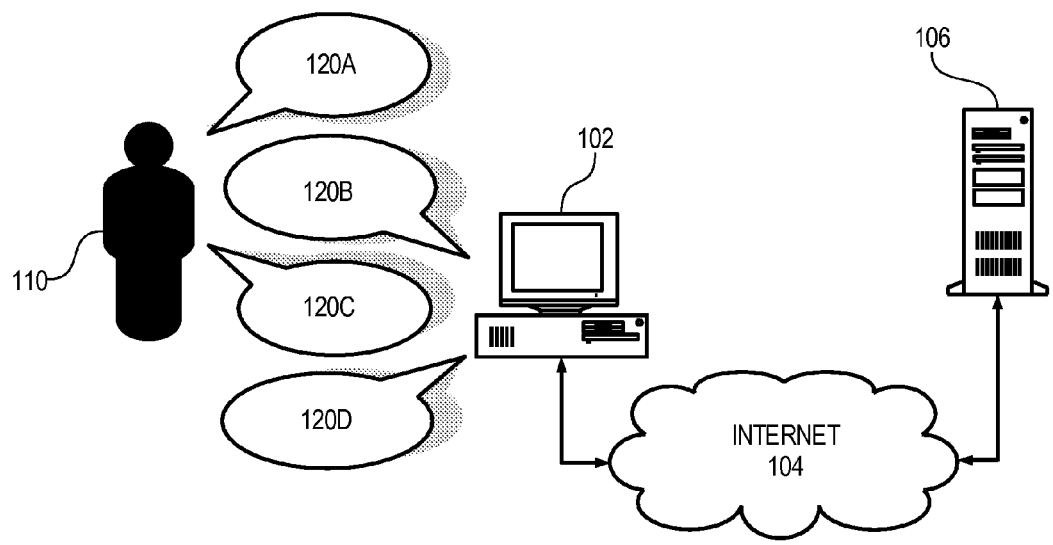
FIG. 1 is a block diagram showing a computer conversing with a user in accordance with the present invention.

Rate events are events in which user 110 has expressed a quantitative evaluation of satisfaction with the ongoing dialog shown in FIGS. 1 and 2. While the dialog progresses, user 110 is able to move a GUI slider or other GUI element representing a level of satisfaction. Such ratings are communicated to ALC 300 and logged in frame 1206. If a particular memory of ANR 302 receives relatively low scores consistently, mindwriter 904 determines remedial modifications to apply to memories of ANR 302 and implements those modifications in the manner described above with respect to novelties.

Outstring Sequences

Sometimes, an answer to a question of user 110 can be complex, requiring a relatively lengthy and complex responsive outstring. As described above, an associated hyperlink in a memory can cause display of a web page or other multimedia content in conjunction with presentation of the outstring. However, in situations involving relatively lengthy and/or complex outstrings, it may be desirable to present a sequence of web pages or other multimedia content. To provide this ability, outstrings can have one or more appended sequences, e.g., as a linked list for example.

A sequence is represented as a memory with only an outstring, an optional associated hyperlink, and an optional sequence link to the next sequence if one is present. During presentation of the outstring of the memory evoked by the most recent utterance of user 110, ALC 300 presents the outstring of the memory to user 110 and concurrently displays content identified by the associated hyperlink of the outstring. Upon completion of presentation of the outstring, ALC 300 retrieves the outstring of the immediately following sequence and concurrently displays content identified by the associated hyperlink of the sequence. Thus, the transition from completion of starting outstring to beginning of presentation of the immediately following outstring also effects a transition from concurrent display of the content of the associated hyperlink of the former to concurrent display of the content of the associated hyperlink of the latter.

The result is an orchestrated slideshow of web pages or other multimedia content adding contextual information to the subject matter spoken by ALC 300.

Subject Segue

On occasion, user 110 (FIG. 1) will deviate substantially from the current subject with an utterance pertaining to a different, perhaps unrelated, subject. For example, user 110 and ALC 300 can be conversing about mosquitoes when a responsive utterance by ALC 300 mentions Canada, to which user 110 responds with an utterance about Canada, such as "What is the capital of Ontario?"

Figure 14:
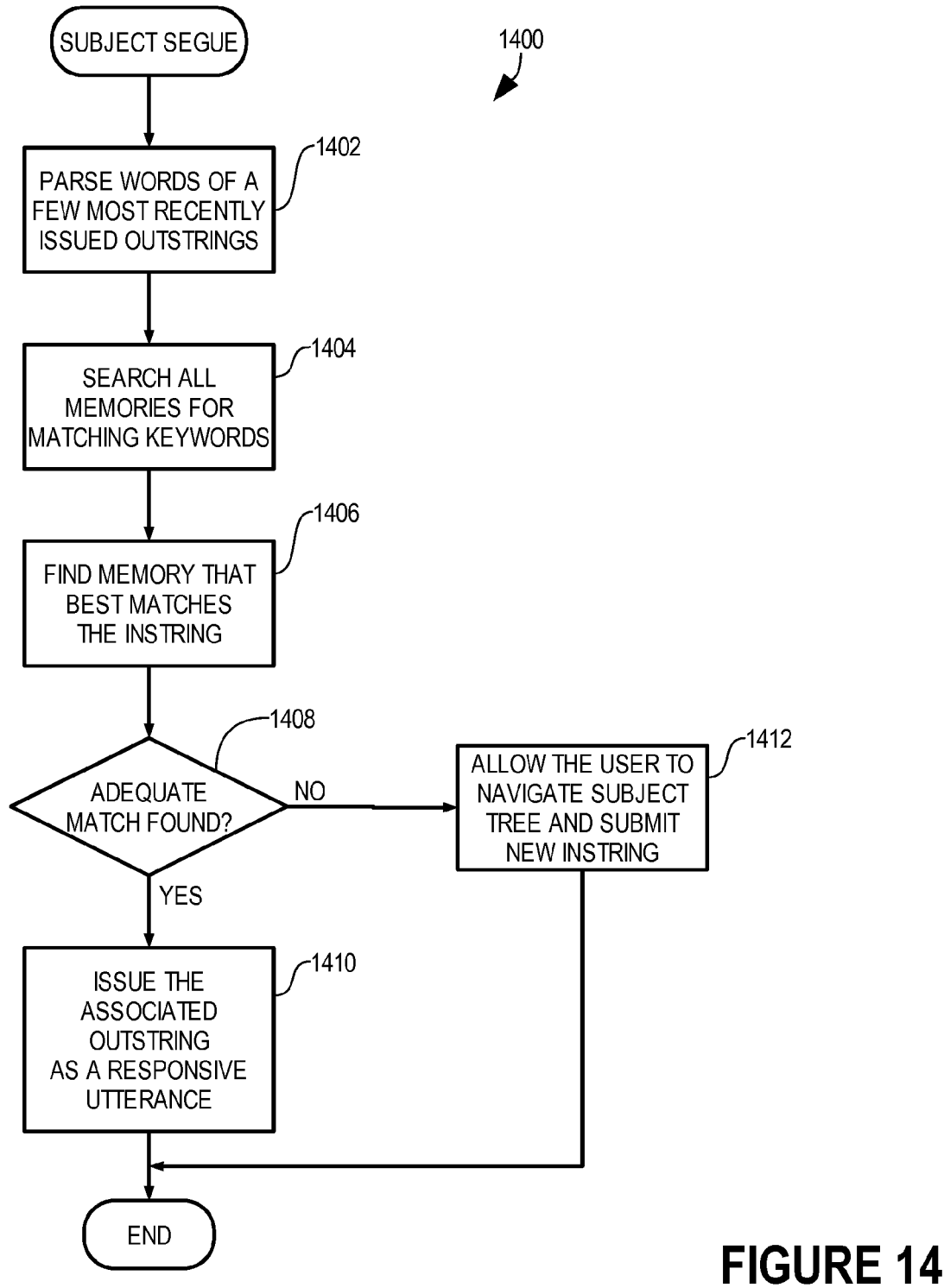
FIG. 14 is a logic flow diagram illustrating determination of a new subject when no artificial memory of the current subject is evoked by a received utterance.

Processing by memory prediction loop 320 in such circumstances are described above with respect to lines 513-529 (FIG. 5). In an alternative embodiment, memory prediction loop 320 processes the failure to adequately match a linguistic memory in the current subject of ANR 302 in the manner shown in logic flow diagram 1400 (FIG. 14).

In step 1402, memory prediction loop 320 (FIG. 3) parses the few most recently issued outstrings into individual words and, in step 1404 (FIG. 14), searches for any artificial linguistic memories in any subject with one or more keywords matching those outstring words. In illustrative embodiments, the two or three most recently issued outstrings are used. The underlying assumption here is that something in one of the recently issued outstrings sparked an interest in another subject in user 110. Using the words of a few recently issued outstrings as keywords to search memories of ANR 302 allows memory prediction loop 320 to narrow the broad search for a new search substantially and to therefore improve performance and apparent continuity of conversation with user 110.

In step 1406, memory prediction loop 320 (FIG. 3) identifies the best matching of the memories using the string match logic described above. In test step 1408 (FIG. 14), memory prediction loop 320 (FIG. 3) determines whether the best matching of the memories adequately matches the instring. In this illustrative embodiment, an adequate match is determined by comparison of the determined likelihood that the invariant representation matches the instring to a predetermined threshold likelihood, e.g., 60%.

If memory prediction loop 320 determines that the best match is adequate, processing transfers to step 1410 in which memory prediction loop 320 issues the outstring of the best matching memory as a responsive utterance and sets the current subject to the subject with which the matching memory is associated. Conversely, if memory prediction loop 320 determines that the best match is inadequate, processing transfers to step 1412.

In step 1412 (FIG. 14), memory prediction loop 320 provides a graphical user interface to user 110 through computer 102 by which user 110 can navigate and browse the hierarchical subject tree to identify a subject of interest to the user. Upon selection of a new subject by user 110, memory prediction loop 320 processes the most recently received utterance of user 110 in the newly selected subject to recall the best matching artificial linguistic memory. In addition, memory prediction loop 320 allows the user to make a new utterance to continue conversing in the newly selected subject in the manner described above.

Server/Client Distribution of ALC 300 and Prediction Arrays

In this illustrative embodiment, ALC 300 (FIG. 3) is implemented in computer 102 (FIG. 1) and computer 106 stores artificial linguistic memories of various subjects that are available to ALC 300. In this embodiment, computer 102 (FIG. 1) is able to converse with user 110 until a new subject is needed. When a new subject is needed, computer 102 sends the few most recently issued outstrings to computer 106, and computer 106 uses the outstrings to select a new subject in the manner described above with respect to logic flow diagram 1400 (FIG. 14).

In another embodiment, ALC 300 (FIG. 3) is implemented in computer 106 (FIG. 1) and user 110 converses with ALC 300 through a thin client, e.g., an ordinary web browser, executing within computer 102 and communicating with computer 106 through Internet 104. Such allows many users to converse with ALC 300 with minimal configuration of their respective client computer systems. In this illustrative embodiment, user 110 communicates with ALC 300 textually through an application that is, or resembles, a conventional instant messaging application. Messages typed by user 110 using computer 102 are passed through Internet 104 to computer 106 in which ALC 300 determines a responsive message to pass back through Internet 104 to computer 102 to display to user 110.

In another thin client embodiment, the thin client can be a Voice Over Internet Protocol (VoIP) client through which user 110 sends and receives audio voice messages. The voice message is received through Internet 104 by computer 106 and converted to text using conventional speech-to-text techniques. ALC 300 processes the converted text instring in the manner described above to produce an outstring representing a responsive message. Computer 106 uses conventional text-to-speech techniques to synthesize a voice message that articulates the outstring and sends the voice message through Internet 104 to computer 102 for playback to user 110 as a spoken voice message. Conventional telephony equipment can also be used by user 110 to communicate by exchanging voice signals with computer 106 through conventional computer telephony circuitry and the public switched telephone network.

In other embodiments, computer 102 can be used to perform some of the pre-processing or post-processing or processing of ALC 300 to minimize network traffic and/or to reduce or compensate for network latency. For example, in one embodiment, a client application executing within computer 102 performs speech-to-text processing of utterances from user 110 and text-to-speech processing of responsive utterances for playback to user 110. Thus, user 110 can converse orally with computer 102 and computer 102 can translate the spoken messages to text and converse textually with ALC 300 within computer 106 through Internet 104.

In another embodiment, a client application executing within computer 102 replicates a portion of the logic of memory prediction loop 320 to help avoid conversational delays due to network latency through Internet 104. In this embodiment, ALC 300 executing in computer 106 sends, with each outstring representing a responsive message, a prediction array of memories. In particular, ALC 300 sends all children memories of the particular memory evoked by the most recently received instring as the prediction array. When user 110 issues a subsequent utterance, captured as another instring, the client application both sends the new instring through Internet 104 to ALC 300 within computer 106 and independently applies the portion of memory prediction logic shown at lines 507-508 to determine whether a memory in the prediction array is evoked.

If a memory in the prediction array is evoked, the client application can issue the outstring of the evoked memory directly without waiting for a responsive outstring from ALC 300. ALC 300 processes the instring in the same manner concurrently and sends the same outstring, produced using the same logic, along with a new prediction array. Since the client application has already issued a responsive utterance, the client application ignores the outstring from ALC 300 but stores the new prediction array received from ALC 300. Thus, the client application can immediately respond to user 110 notwithstanding significant latency through Internet 104. The client application experiences a substantial lull during which user 100 composes, orally or textually, another utterance. During this lull, the client application has plenty of time to receive the outstring and the new prediction array.

Conversely, if no memory in the prediction array is evoked, the client application simply waits for the outstring and new prediction array from ALC 300.

In this illustrative embodiment, ALC 300 sends the outstring representing the responsive utterance separately from and prior to sending a corresponding prediction array to avoid delaying receipt of the outstring by the client application.

The above description is illustrative only and is not limiting. Instead, the present invention is defined solely by the claims which follow and their full range of equivalents.

APPENDIX A

```
'***************************************************
' Function StrCompare
' Purpose: Compare two strings and return a value of how similar they are
' Returns: A value in the range of 0 (0%) to 1 (100%) (0 being not at all,
'          and 1 being exact)
' .76235 would be 76%
' Algorithm:
' Similarity(s1,s2) = (2 * |nIntersection|) / (|pairs(s1)| + |pairs(s2)|)
' nIntersection is the number of pairs that both strings have in common
' The pipes mean number of
' Example:
' Compare "FRANCE" with "FRENCH"
' First, group each word into letter pairs:
' FRANCE: {FR, RA, AN, NC, CE}
' FRENCH: {FR, RE, EN, NC, CH}
' Second, determine the intersection between the two strings:
' Intersection is {FR, NC}
' Third, plug the variables into the formula:
' Similarity(FRANCE,FRENCH) = (2 * |{FR, NC}|) / (|{FR, RA, AN, NC, CE}| + |
'           {FR, RE, EN, NC, CH}|)
' Similarity(FRANCE,FRENCH) = (2 * 2) / (5 + 5)
' Similarity(FRANCE,FRENCH) = 4 / 10 = .4 = 40%
'***************************************************
Public Function Utl_StrCompare(ByVal RefStr As String, ByVal Str2Compare As
          String) As Double
    Dim pairs1( ) As String, pairs2( ) As String, pair1 As String, pair2 As String
    Dim intersection As Long, union As Long, i As Long, j As Long
    'Init
    intersection = 0
    pairs1 = Utl_StrCompareWordLetterPairs(UCase(RefStr))
    pairs2 = Utl_StrCompareWordLetterPairs(UCase(Str2Compare))
    union = UBound(pairs1) + UBound(pairs2) + 2
    For i = 0 To UBound(pairs1)
        pair1 = pairs1(i)
        For j = 0 To UBound(pairs2)
            pair2 = pairs2(j)
            If pair1 = pair2 Then
                intersection = intersection + 1
                pairs2(j) = " "
                Exit For
            End If
        Next
    Next
```

-continued

APPENDIX A

```
Utl_StrCompare = (2 * intersection) / union
End Function
'*******************************************************
' Function StrCompareWordLetterPairs
' Purpose: Takes a string of word(s) and turns them into 2-character strings
' Returns: An array where each element is a 2-character string pair
'*******************************************************
Private Function Utl_StrCompareWordLetterPairs(s As String) As String( )
Dim allPairs( ) As String, pairsInWord( ) As String, words( ) As String, word As
        String
Dim apcntr As Long, i As Long, j As Long
'Init
apcntr = 0
ReDim allPairs(0)
allPairs(0) = " "
'Get a list of words (separated by spaces)
words = Split(s, " ")
For i = 0 To UBound(words)
    'Find the pairs of characters
    pairsInWord = Utl_StrCompareLetterPairs(words(i))
    'Add the pairs to master list
    For j = 0 To UBound(pairsInWord)
        ReDim Preserve allPairs(apcntr)
        allPairs(apcntr) = pairsInWord(j)
        apcntr = apcntr + 1
    Next
Next
Utl_StrCompareWordLetterPairs = allPairs
End Function
'*******************************************************
' Function StrCompareLetterPairs
' Purpose: Takes a string (1 word) an pairs up adjacent letters
' Returns: An array where each element is an adjacent letter pair
'*******************************************************
Private Function Utl_StrCompareLetterPairs(s As String) As String( )
Dim pairs( ) As String
Dim numPairs As Long, i As Long
numPairs = Len(s) − 2
ReDim pairs(numPairs)
For i = 0 To numPairs
    pairs(i) = Mid(s, i + 1, 2)
Next
Utl_StrCompareLetterPairs = pairs
End Function
```

What is claimed is:

1. A non-transitory computer readable medium useful in association with a computer which includes a processor and a memory, the computer readable medium including computer instructions which are configured to cause the computer to implement a conversational user interface by performing a method comprising the steps of:

a) receiving utterance data representing a linguistic message from a person;

b) searching among artificial linguistic memories for a matching one of the artificial linguistic memories;

c) determining whether the matching artificial linguistic memory matches the utterance data by at least a predetermined degree of similarity;

d) upon a condition in which the matching artificial linguistic memory matches the utterance data by at least the predetermined degree of similarity, presenting a responsive message to the person, wherein the responsive message is associated with the matching artificial linguistic memory;

e) upon a condition in which the matching artificial linguistic memory match the utterance data by less than the predetermined degree of similarity, initiating symbiotic learning so as to acquire a new linguistic memory that matches the utterance by at least the predetermined degree of similarity, wherein initiating symbiotic learning comprises sending a request to a human mindwriter for symbiotic teaching, and wherein the request includes packaged subject dialog sent to the mindwriter as part of an e-mail message;

f) and, receiving remedial modifications from the mindwriter, and wherein the remedial modifications are effected within an artificial linguistic cortex.

2. The non-transitory computer readable medium of claim 1, wherein the artificial linguistic cortex implements the remedial modifications within an artificial neocortical region.

3. The non-transitory computer readable medium of claim 1, wherein the artificial linguistic cortex sends the person a responsive message to the utterance data previously determined to possess less than the predetermined degree of similarity to the matching artificial linguistic memory.

4. The non-transitory computer readable medium of claim 3, wherein the responsive message to the utterance data sent by the artificial linguistic cortex is an e-mail, and wherein the e-mail includes a hyperlink that can be used in conjunction with a web browser executing within the computer to resume dialog between the person and the artificial linguistic cortex.

\* \* \* \* \*